United States Patent [19]

Hixon

[11] 3,796,444
[45] Mar. 12, 1974

[54] TRUCK-TRAILER COMBINATION WITH IMPROVED HITCH

[76] Inventor: William K. Hixon, 3494 Granite Creek Rd., Scotts Valley, Calif. 95060

[22] Filed: Sept. 5, 1972

[21] Appl. No.: 286,370

[52] U.S. Cl. .............................. 280/483, 280/423 R
[51] Int. Cl. ............................................. B62d 59/00
[58] Field of Search ........... 280/423, 511, 512, 513, 280/405 R, 407, 483

[56] References Cited
UNITED STATES PATENTS

| | | | |
|---|---|---|---|
| 3,659,876 | 5/1972 | Melton | 280/423 R |
| 3,650,546 | 3/1972 | Koenig | 280/432 R |
| 3,436,101 | 4/1969 | Hanson | 280/511 R |
| 3,220,750 | 11/1965 | Mead | 280/423 R |

Primary Examiner—Leo Friaglia
Assistant Examiner—Randall A. Schrecengost
Attorney, Agent, or Firm—Townsend and Townsend

[57] ABSTRACT

An improved hitch assembly for a truck-trailer combination of the type using a pick-up truck wherein the hitch assembly includes a beam secured to a pair of spaced rigid, transverse members connected to the frame of the pick-up truck in a manner such that a hitch ball can be adjustably secured to the front end of the beam and forwardly of both of the rigid members. The hitch ball can then be connected to a vertical segment of a gooseneck tongue on the trailer. The ratio of the distance between the hitch ball and one of the transverse members and the distance between the two transverse members can be selected to assure proper load distribution between the front and rear wheels of the truck and to provide control of the forward movement of the truck when side loads are exerted on the trailer. An improved sleeper unit for attachment to the truck bed forwardly of the hitch is also disclosed.

11 Claims, 13 Drawing Figures

PATENTED MAR 12 1974  3,796,444

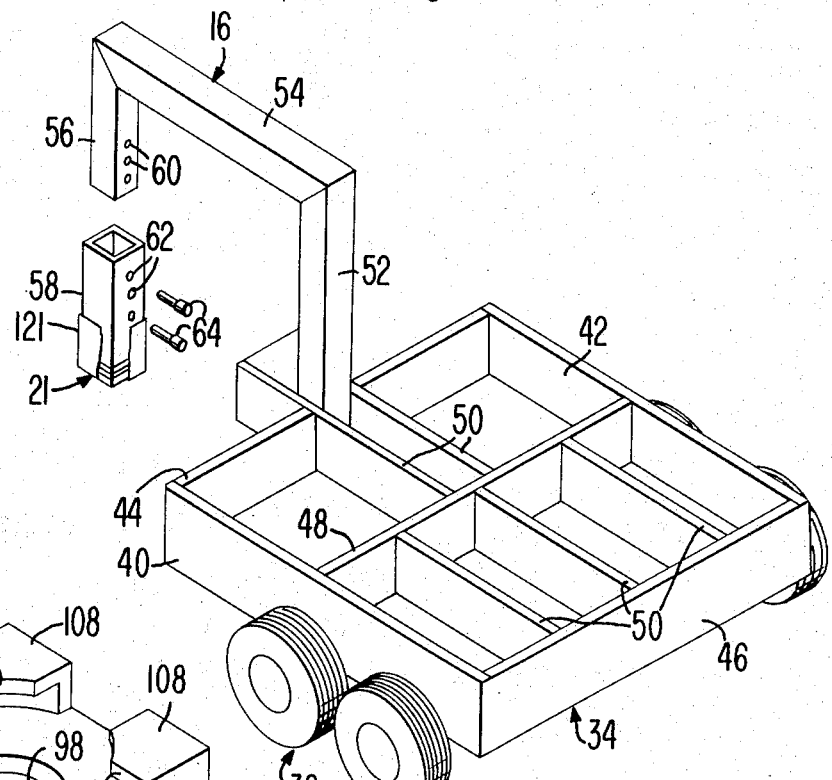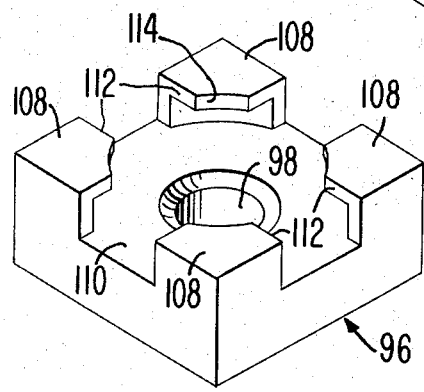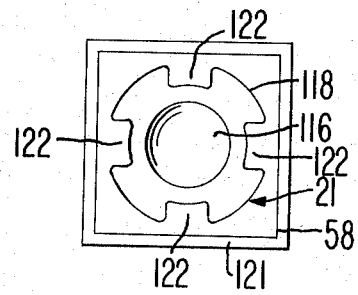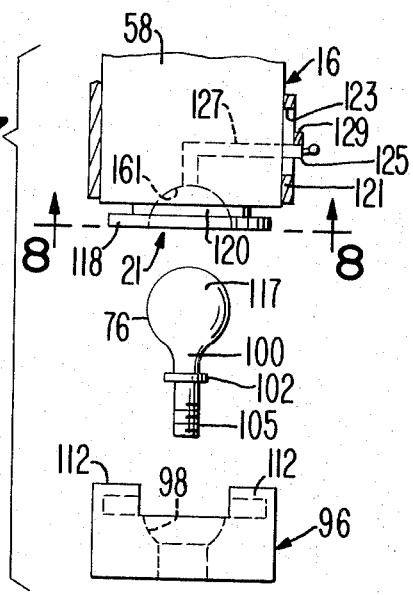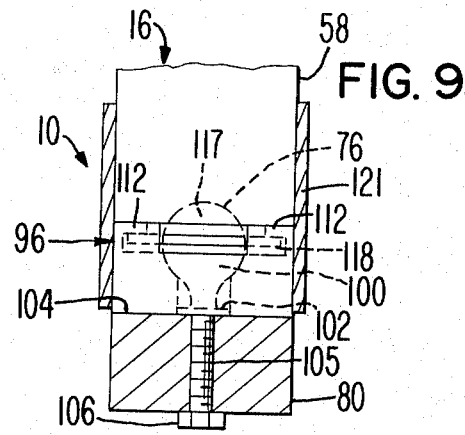

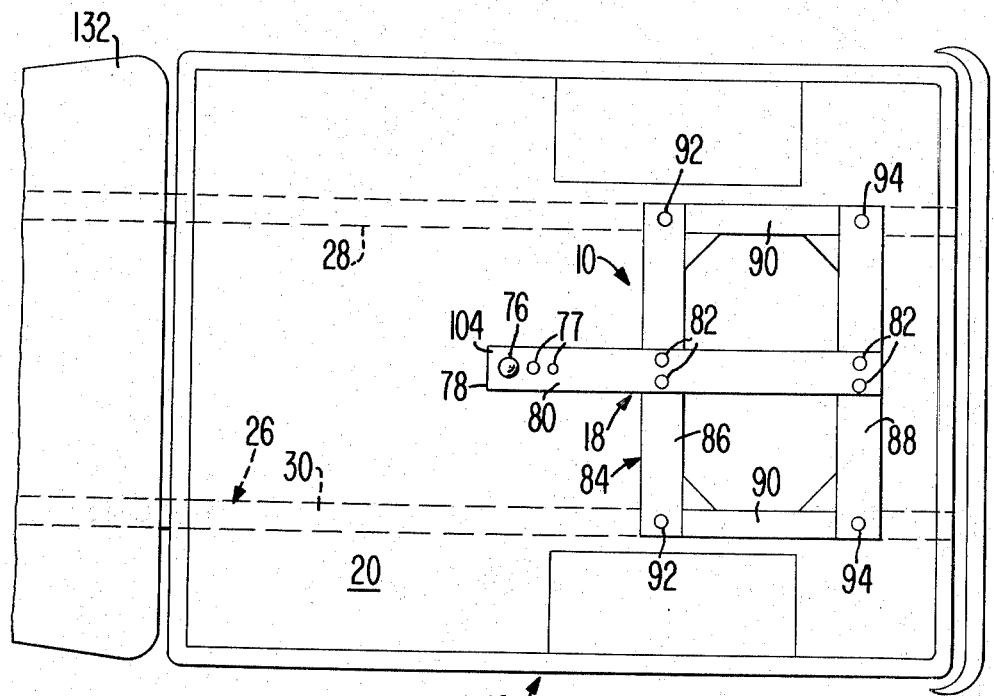
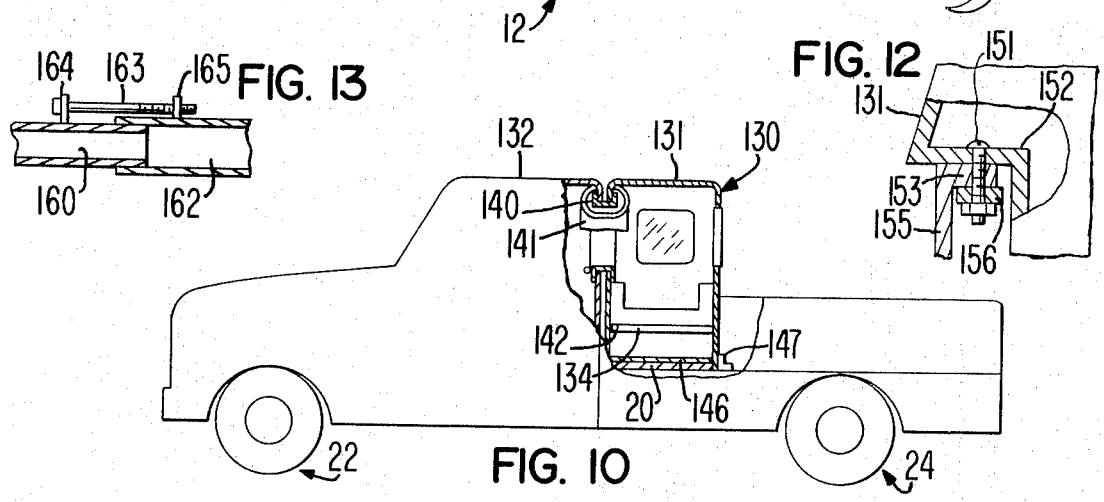
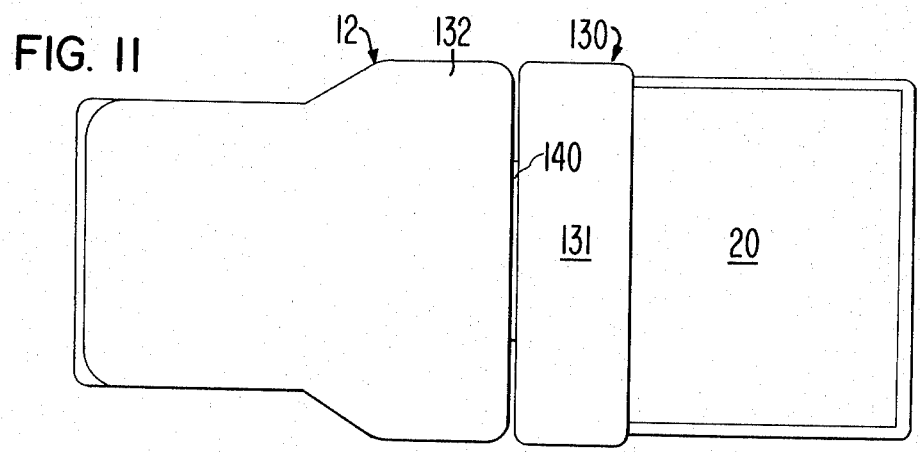

TRUCK-TRAILER COMBINATION WITH IMPROVED HITCH

This invention relates to improvements in the manner in which trailers are connected to towing vehicles and, more particularly, to an improved trailer hitch for attachment to the bed of a pick-up truck.

BACKGROUND OF THE INVENTION

Conventional trailer hitches on trucks or automobiles are placed near the rear bumpers and consist of hitch balls which are rigidly secured to the frame of the vehicle rearwardly of the rear wheel and axle assembly thereof. This type of hitch causes problems in controlling the side sway of a trailer due to wind and other forces because any tendency for the trailer to go in one direction sideways causes the truck or towing vehicle to be driven sideways in the opposite direction. This phenomena is difficult to overcome and requires a skilled driver to minimize the oscillations of the trailer. The speed of the towing vehicle must be reduced to minimize the amplitude of side sway of the trailer. Oftentimes, corrective action is taken too late to avoid serious accidents.

A conventional hitch of the type described operates to apply the entire load of the trailer rearwardly of the rear wheels of the towing vehicle. This causes the front wheels of the vehicle to lift somewhat, thereby limiting control of the truck during forward movement. Tension bars and other types of structures have been used on the tongues of trailers to minimize this problem; however, they do not completely eliminate the problem.

A fifth wheel structure has been developed for the bed of a pick-up truck to interconnect the latter and a trailer to be towed. Such a structure does not provide the stability necessary to easily control the forward movement of the truck in case of side sway of the trailer. Also, the structure does not properly distribute the load of the trailer on both front and rear wheels of the truck. Furthermore, any tendency for the trailer to tip to the side immediately causes the truck to tip also.

SUMMARY OF THE INVENTION

The present invention is directed to an improved hitch for a pick-up truck for interconnecting the latter and a trailer having a gooseneck tongue wherein the hitch provides increased control of the truck as it pulls the trailer over the road to eliminate the problems associated with side sway of the trailer and to distribute the load of the trailer more evenly between the front and rear wheels of the truck. To this end, the hitch assembly of the invention utilizes a beam having a hitch ball at its forward end and provided with a pair of spaced, transverse, rigid members spaced rearwardly from the hitch ball and secured by resilient snubbers to the underframe of the truck itself. Thus, the trailer tongue, connected to the hitch ball, will have its load applied both to the front and to the rear wheels, yet the hitch is constructed so that any side forces applied to the trailer itself will cause the truck to move in the direction of the applied side force on the trailer. Thus, there will be no "fishtailing" of the trailer with respect to the truck so that dangerous oscillations of the trailer cannot build up to cause serious accidents. The hitch is simple and rugged and constructed so that the ratio between the hitch ball and the intermediate rigid member and the distance between the rigid members themselves has a specific value between 1 and 2. Selecting a value in this range will assure that the hitch will provide proper control of the truck yet allow the proper load distribution between the front and rear wheels thereof. The hitch ball can be adjustably mounted on the beam so as to permit variation in the aforesaid ratio to suite specific trailer weights and wheel base distances of various pick-up trucks.

The pick-up truck can also be provided with a sleeper unit removably mounted thereon in a manner such that the sleeper unit can connect directly with the cab of the truck at the rear window opening thereof. To this end, the sleeper unit has means thereon for releasably securing the same to the truck bed forwardly of the aforesaid hitch and has an improved connecting band securing the truck cab to the front wall of the sleeper unit, thereby permitting a sealed junction yet permitting access to and egress from the sleeper unit. To this end, the band has means for adjustably interconnecting its ends, whereby the band can be quickly and easily inserted into an operational position or removed therefrom depending upon whether the sleeper unit is to be placed on or taken off the truck.

The primary object of this invention is to provide an improved hitch assembly for a pick-up truck for pulling a trailer having a gooseneck hinge wherein the hitch assembly includes a hitch ball on a cantilever beam which operates to distribute the load of the trailer between the front and rear wheels of the truck yet allows side forces on the trailer to be transmitted in the same direction to the truck so as to provide greater control of the latter when pulling a trailer over the road.

A further object of this invention is to provide a hitch assembly of the aforesaid character which permits the trailer to have a gooseneck tongue whereby the trailer can carry a conventional camper unit to allow the truck to be unhitched from the trailer at a camp site and to be used for trips to and from the latter without having to carry the camper unit itself.

Still another object of this invention is to provide an improved sleeper unit for the trailer of the type described wherein the sleeper unit has a front opening which communicates with the rear opening of the truck cab yet the sleeper unit can be located on the bed of the truck without interfering with the hitch assembly thereof.

Other objects of this invention will become apparent as the following specification progresses, reference being had to the accompanying drawings for an illustration of the invention.

In the drawings:

FIG. 4 is a top plan view of the bed of the truck and the hitch assembly thereon;

FIG. 5 is a perspective view of the trailer and another part of the hitch assembly;

FIG. 6 is an enlarged, perspective view of the connector of the hitch assembly;

FIG. 7 is an exploded, fragmentary view of the hitch assembly;

FIG. 8 is a bottom plan view of the hitch assembly looking in the direction of line 8—8 of FIG. 7;

FIG. 9 is an enlarged, fragmentary, cross-sectional view of the hitch assembly when the parts of the same are interconnected;

FIG. 10 is a side elevational view of the truck with an auxillary sleeper unit removably coupled to the cab thereof, parts being broken away in section.

FIG. 11 is a top plan view of the truck and sleeper unit of FIG. 10;

FIG. 12 is a fragmentary, cross-sectional view of the sleeper unit, showing another way of connecting it to a truck bed; and FIG. 13 is a fragmentary, top plan view of the ends of the band for interconnecting the truck and sleeper unit.

Figure 3:
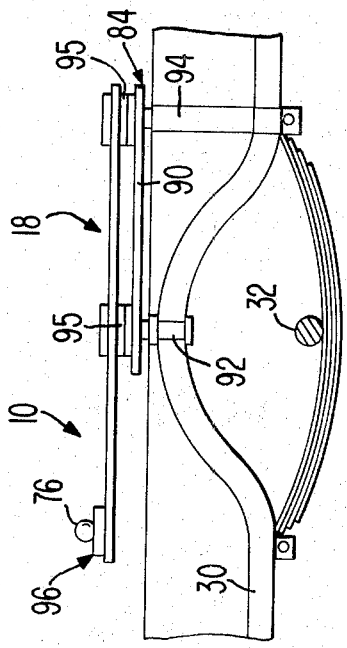
FIG. 3 is an enlarged, fragmentary, side elevational view of the lower part of the hitch assembly showing the way in which it is connected to the frame of the truck.

The present invention relates to an improved hitch assembly 10 for a truck-trailer combination including a truck 12 and a trailer 14 having a gooseneck tongue 16 releasably connected by hitch assembly 10 to truck 12. One part 18 of the hitch assembly is carried on the bed 20 of truck 12. Truck 12 is shown as a standard pick-up having front and rear wheel assemblies 22 and 24 carried by a frame 26 formed of a pair of generally parallel frame members 28 and 30 (FIGS. 3 and 4). Each frame member curves upwardly and about the rear axle 32 (FIGS. 1 and 3) of rear wheel assembly 24.

Trailer 14 is provided with a main frame 34 (FIG. 5) having a pair of wheel and axle assemblies 36 and 38. Frame 34 has a pair of sides 40 and 42, a front wall 44 and a rear wall 46, walls 44 and 46 interconnecting the front and rear ends, respectively, of sides 40 and 42. A number of intermediate, rigidifying members 48 and 50 are disposed within frame 34 (FIG. 5 ) to strengthen the same.

Tongue 16 includes a first, generally vertical, rear segment 52 rigid to and extending upwardly from the front end of frame 34, a second, generally horizontal, central segment 54 extending forwardly from and rigid to the upper end of segment 52, and a third, generally vertical, front segment 56 extending downwardly from and rigid to the front end of segment 54. Segment 56 is telescopically received within the upper, open end of a tubular segment 58 having part 21 of hitch assembly 10 on its lower end. Holes 60 in segment 56 are alignable with corresponding holes 62 in segment 58 so that a pair of pins 64 can be used to releasably and adjustably interconnect segments 56 and 58. In this way, part 21 of hitch assembly 10 can be adjusted in height relative to part 18 so that trailer 14 will be horizontally disposed when it is connected to truck 12.

Trailer 14 is adapted to support a camper unit 66 (FIGS. 1 and 2) of conventional construction. To this end, camper 66 has a lower central body 68 which is adapted to be placed on and to be supported by frame 34, the width of lower body 68 being less than the width of frame 34 as shown in FIG. 2. The upper body 70 of camper 66 has a width essentially the same as that of trailer frame 34 so as to overhang and be spaced above the side margins of frame 34 to define spaces 72 (FIG. 2) which can accommodate storage compartments (not shown) or other structural members. Camper unit 66 has a forwardly projecting part 74 (FIG. 1) overlying central segment 54 of tongue 16. Fastener means (not shown) releasably interconnects camper 66 and trailer 14 so that the camper can be removed from the trailer as desired to thereby allow the trailer to be used for other purposes.

Hitch assembly 10 includes a hitch ball 76 which is secured to the front end 78 (FIG. 4) of a rigid beam 80 secured by bolts 82 to a frame 84 comprised of a front member 86, a rear member 88, and a pair of side members 90 (FIG. 4). Side members 90 are secured by fasteners 92 and 94 (FIG. 3) to respective frame members 28 and 30 so that frame 84 is secured at four locations to the main frame of the vehicle. To this end, frame 84 is spaced above the bed 20 of the truck and fasteners 92 and 94 extend through the bed and are rigidly connected to frame members 28 and 30 in any suitable manner. Fasteners 92 are substantially above rear axle 32 as shown in FIG. 3; thus, ball 76 is forwardly of rear axle 32. Also, resilient snubbers 95 (FIG. 3) are disposed between beam 80 and front and rear frame members 86 and 88.

A connector 96 (FIGS. 6 and 7) forming another part of hitch assembly 10 is rotatably mounted on lower part 100 of ball 76 and is adapted to be releasably interconnected to part 21 on the lower end of segment 58 (FIG. 5) whereby parts 18 and 21 are coupled together to thereby interconnect the truck and the trailer. To this end, connector 96 has a countersunk central hole 98 through which lower part 100 of ball 76 extends as shown in FIG. 9. Part 100 has a flange 102 which abuts the upper surface 104 of beam 80 and a threaded shank 105 rigid to lower part 100 extends downwardly from flange 102 through beam 80 (FIG. 9). A nut 106 is threaded on the lower end of shank 105 to secure the latter to beam 80.

Connector 96 is also provided with four corner projections 108 (FIG. 6), each projection extending upwardly from the flat, upper surface 110 of connector 96 and having an overhanging, lateral portion 112 which is spaced above surface 110. Each portion 112 has an arcuate surface 114 (FIG. 6) which faces toward central hole 98 of connector 96.

Part 21 on the lower end of segment 58 is shown in FIG. 8 and includes a hemispherical recess 116 for receiving the upper part 117 of ball 76, and a flange 118 surrounding recess 116 and extending laterally from the lower end of a short cylindrical extension 120 (FIG. 7) whose maximum transverse dimension is less than that of segment 58. Flange 118 has four recesses 122 at its outer periphery which are adapted to mate with projecting portions 112 of connector 96 so that the lower face 124 of flange 118 can be brought into substantially abutting relationship to surface 110 of hitch member 96. When this occurs, connector 96 is rotated approximately 90° relative to ball 76 until flange 118 is moved beneath and frictionally engages the lower surfaces of lateral portions 112. This will, therefore, interconnect parts 18 and 21 of hitch assembly 10 yet will allow the truck to pivot relative to the trailer about a vertical axis through ball 76 since connector 96 is rotatably mounted on the ball.

Figure 1:
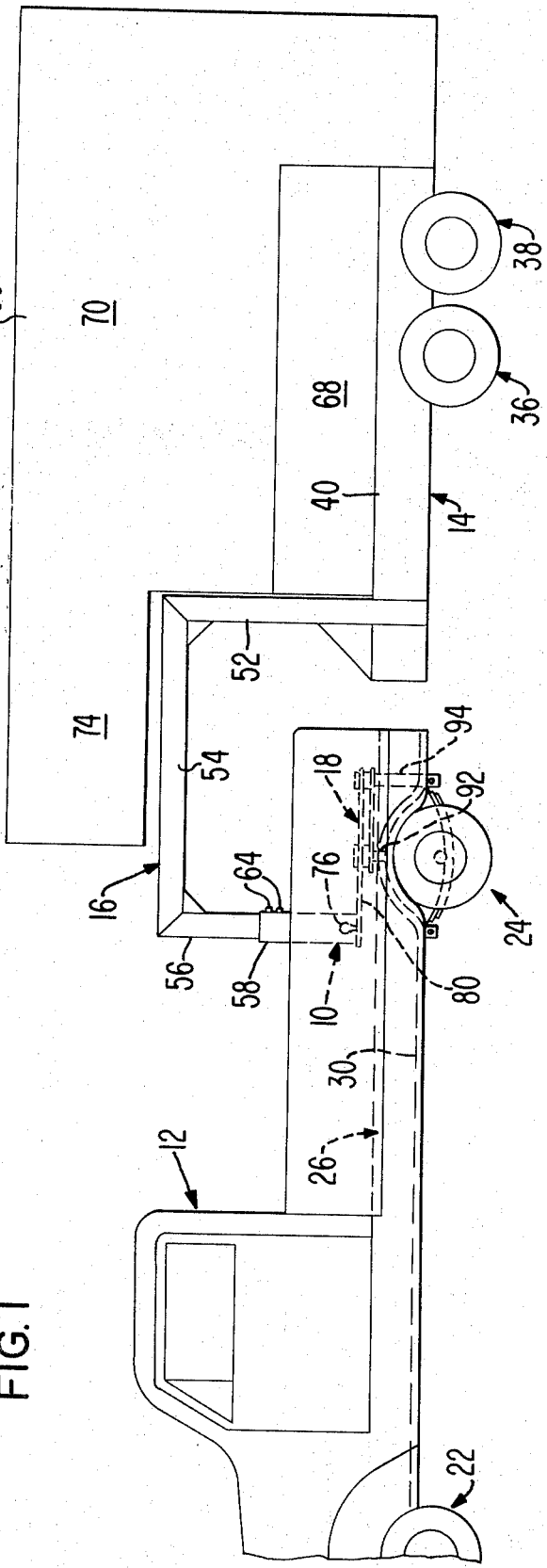
FIG. 1 is a side elevational view of the truck-trailer combination utilizing the hitch assembly of this invention and showing a camper unit on the trailer.
Figure 2:
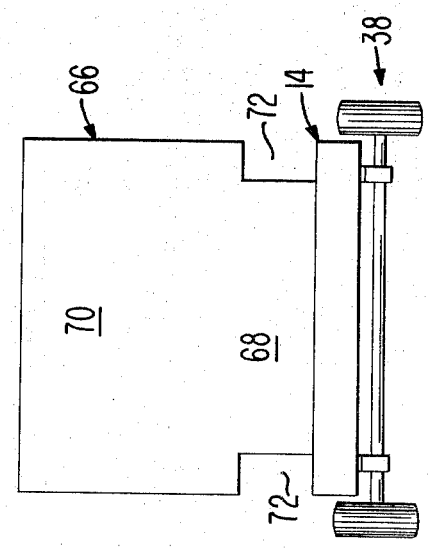
FIG. 2 is a rear elevational view of the trailer and camper unit.

In use, trailer 14 is initially positioned so that truck 12 can back into the location of FIG. 1 at which segment 58 will overlie ball 76. To this end, the front end of the trailer will be sufficiently elevated by a jack (not shown) so that segment 58 will be spaced above the ball to allow the latter to be moved beneath segment 58. When the jack is lowered, segment 58 moves onto the ball so that the latter enters recess 116. Also, connector 96 is initially adjusted to cause recesses 122 of flange 118 to be aligned with portions 112 of connector 96. When segment 58 is lowered, portions 112 pass through respective recesses 122 and, when connector 96 is rotated to position flange 118 beneath portions 112 in frictional engagement therewith, the truck and trailer are thereby interconnected. The foregoing will be accomplished after segments 56 and 58 will have been adjusted so as to cause trailer 14 to be horizontally disposed when it is connected to the truck shown in FIG. 1. Camper unit 66 also will have been placed on the trailer. The truck and trailer combination is then ready for over the road use.

As the truck-trailer combination moves over the road, side members 90, because these are rigid to frame members 28 and 30, tend to prevent the truck frame from twisting. Moreover, there is a minimum of lateral sway of the truck or trailer and the truck does not pitch up and down when it hits a bump. Hitch assembly 10 allows the truck to move up and down as a unit. The cantilever mounting of tongue 16 of trailer 14 and the mounting of the tongue on the front of beam 80 assures that steering of the truck will be much easier than can be achieved with conventional hitch structures. Also, the cantilever feature places the load so that it is distributed between the front and rear wheels of the truck rather than exclusively at the rear wheels because a downward force on the front end of beam 80 tends to apply an upward force on rear frame member 88.

When side pressures are applied to the trailer, such as due to wind forces, such side pressures are distributed between the front and rear wheels. This is all due to the way in which frame 84 carries beam 80, specifically, to the ratio of the distance between ball 76 and the connection of beam 80 with frame member 86 and the distance between the last-mentioned connection and the rear connection of the beam with frame member 88. This ratio provides the key to achieving the desired control. By properly selecting this ratio, not only can steering be easier, but the driver of the truck can have complete control thereof even though side forces of relatively large magnitudes are exerted on the trailer as it is pulled over the road by the truck.

The dimensions of hitch 10 to realize the beneficial results can be indicated by dimensions A and B (FIG. 4). A suitable value for dimension A is approximately 17 inches (whereas a suitable value of dimension B is 22 inches). This would give a ratio of B to A of a value greater than 1. However, it may be desirable, depending upon the weight of the trailer to adjust the position of hitch ball 76. To this end, a pair of additional holes 77 are provided on beam 80 as shown in FIG. 4 so that the position of the hitch ball can be varied, if desired. As the ball is moved rearwardly on the beam, the ratio of B to A more nearly approaches 1.

In lieu of fasteners 82, beam 80 could be welded to front and rear frame members 86 and 88. Also, side frame members 90 could be eliminated if desired so that there would be no connection other than beam 80 between front and rear frame members 86 and 88.

The advantage of coupling trailer 14 to the truck in the manner described allows the truck to be used separately from camper 66 at a camp site. Thus, when the camp site is reached, the trailer can be unhitched from the truck so that the camper unit can be used in a fixed position, thereby allowing the truck to be used for trips to and from the camp site.

To prevent rotation of connector 96 when it is coupled to flange 118 (FIG. 9), a sleeve 121 (FIGS. 7–9) is slidably carried on segment 58 and has the same square cross section as the latter. Sleeve 121 is movable from a raised position (FIG. 7) above flange 118 to a lowered, operative position (FIG. 9) surrounding connector 96, the latter also having the same square configuration as segment 58. Sleeve 121 has a side slot 123 for clearing a grease fitting 125 communicating with a passage 127 to recess 116, so that hitch ball 76 can be greased when it is received in recess 116. A swingable toggle 129 can releasably lock sleeve 121 in its raised or lowered position.

Another feature of the invention is the provision of an auxiliary sleeper unit 130 (FIGS. 10 and 11) for releasable attachment to truck 12 immediately behind the cab 132 of the truck. To this end, sleeper unit 130 includes a housing 131 having a width substantially equal to the width of the truck (FIG. 11) and a front-to-rear length sufficient to contain at least one person, such as an infant or small child. Housing 131 has a floor 134 which is spaced below a front opening in the housing which mates with the rear window opening of the truck, the window itself being removed when sleeper unit 130 is to be used. The interior of housing 131 is preferably padded throughout, especially on floor 134 and the front and rear walls extending upwardly therefrom to provide access to infant or child therein to protect it by preventing the infant or child from rolling forwardly or rearwardly so as to strike the front or rear wall. For purposes of illustration, the fore-to-aft thickness of housing 131 is 20 inches and floor 134 is 12 inches below the rear window opening.

A transversely U-shaped connector band 140 spans the distance between the two openings and is covered by a boot 141 of vinyl or other suitable material to seal the junction and to facilitate entering and leaving housing 131. Boot 141 can be provided with snap fasteners to secure it to the inner surfaces of the truck and the sleeper unit or the boot can be contoured so that it fits on band 140 without fasteners. The sides of band 140 prevent it from moving forwardly or rearwardly.

In one form of the sleeper unit, floor 134 can be hinged at a location 142 to allow access to a storage space 144 in the bottom portion 146 of housing 131 and supported by the bed 20 of truck 12 by one or more fasteners 147 (FIG. 10). In lieu of fasteners 147, housing 131 could be secured to the truck by a clamp shown in FIG. 12, wherein bolts 151 extending through an end portion 152 clamps the latter to the upper peripheral flange 153 of the side 155 of the truck by a block 156. Thus, no holes need be drilled in the truck if the clamp feature is used.

In use, sleeper unit 130 is removably mounted on the truck after the rear window of the truck has been removed or slid to an open position. Band 140 is then moved into the rear window opening 138 and secured in place to interconnect the front wall of the sleeper unit to the rear wall of the truck. To achieve this, band 140 has a pair of opposed ends 160 and 162 which are relatively telescoped and adjustably interconnected by a screw 163 rotatably carried on end 160 by a collar 164 and threadably received in a collar 165 on end 162. This construction allows band 140 to be quickly put into place in its operative position or to be readily removed if the sleeper unit is to be taken off the truck. The sleeper unit will be secured by fasteners 147 to bed 20, thereby making the sleeper unit rigid to the truck.

As the truck moves over the road, access to and from the sleeper unit can be had through the rear window opening 138. The presence of the sleeper unit will not interfere with hitch 18; thus, the sleeper unit can be used even while the truck is pulling trailer 14 with camper unit 66 thereon.

I claim:

1. In a truck-trailer combination with the truck having a bed, an improved hitch unit comprising: a beam; a pair of spaced rigid members; resilient means interconnecting the beam and the members with the members being secured to and extending laterally from the beam at spaced locations thereon, one of the members being near one end of the beam and the other member being intermediate the ends of the beam; means coupled with the members for securing the same to the frame of the truck near the rear wheel assembly thereof with said beam extending forwardly of said other member; and a hitch ball secured to the beam forwardly of said other member.

2. In a combination as set forth in claim 1, wherein is included snubber means between said beam and said members.

3. In a combination as set forth in claim 1, wherein the beam has means thereon for removably mounting said hitch ball thereon at any one of a number of operative locations along the length thereof.

4. In a combination as set forth in claim 1, wherein is included a tongue segment adapted to be coupled to the trailer and movable onto the ball, said segment having a hitch part provided with a recess for receiving the ball, and including a connector rotatably mounted on the lower part of the ball and movable into coupled relationship with said hitch part.

5. In a combination as set forth in claim 4, wherein said hitch part has a generally horizontally disposed flange provided with a recess in the outer periphery thereof, said connector including a body having an upper surface and a projection extending upwardly from the surface, said projection having a lateral portion in overlying spaced relationship to said upper surface, said portion receivable within the recess of the flange when the segment is lowered onto the ball, whereby the portion can be moved into overlying relationship with the flange to couple said hitch part to the ball when the connector is rotated through an angle relative to the ball.

6. In a combination as set forth in claim 4, wherein the segment has means thereon for adjustably mounting the same on the trailer.

7. In a combination as set forth in claim 1, wherein the ratio of the distance between the hitch ball and said other member and the distance between said members is a value between 1 and 2.

8. In combination: a pick-up truck having a flat bed and frame means beneath the bed; a hitch unit mounted on said bed near the rear end of the truck, said hitch unit including a beam and a pair of spaced, rigid members secured to and extending transversely of the beam at spaced locations along the length thereof, there being resilient snubber means between said beam and said members, one of the members being adjacent to the one end of the beam and the other member being intermediate the ends of the beam; means securing each rigid member, respectively, to said frame means with the beam extending fore-and-aft relative to the bed and said one end of the beam being adjacent to the rear of said bed; a hitch ball secured to said beam at a location near the other end thereof; a trailer having a tongue provided with a generally vertical segment; and means on the hitch ball and said segment for releasably interconnecting the same, whereby the truck can be coupled to the trailer and at least a portion of the load of the trailer will be distributed between the front and rear wheels of the truck.

9. In the combination as set forth in claim 8, wherein said tongue has a gooseneck shape and includes a second, vertical segment, the first-mentioned vertical segment being tubular and telescopically receiving the second segment, there being means for adjustably interconnecting the first and second segments.

10. In the combination as set forth in claim 8, wherein the lower end of the segment has a recess for receiving said hitch ball and a notched flange surrounding the recess, said hitch ball having a rotatable connector mounted thereon, said connector having a projecting portion for entering the notch of said flange and for overlying the flange when the hitch ball is received within said recess to thereby interconnect the hitch ball and the segment.

11. The combination as set forth in claim 8, wherein the ratio of the distance between the hitch ball and said other member and the distance between said members is a value between 1 and 2.

* * * * *